(12) United States Patent
Bectarte et al.

(10) Patent No.: US 8,561,648 B2
(45) Date of Patent: Oct. 22, 2013

(54) FLEXIBLE PIPE HAVING HIGH RESISTANCE TO AXIAL COMPRESSION AND METHOD OF MANUFACTURING SUCH A PIPE

(75) Inventors: Fabrice Bectarte, Rouen (FR); Alain Coutarel, Mont Saint Aignan (FR); Pascal Estrier, Saint-Wandrille-Rançon (FR); Patrice Joël Louis Jung, La Mailleraye sur Seine (FR); Jean Rigaud, Rouen (FR)

(73) Assignee: Technip France (FR)

( * ) Notice: Subject to any disclaimer, the term of this patent is extended or adjusted under 35 U.S.C. 154(b) by 936 days.

(21) Appl. No.: 12/438,064

(22) PCT Filed: Aug. 13, 2007

(86) PCT No.: PCT/FR2007/001368
§ 371 (c)(1),
(2), (4) Date: Dec. 29, 2009

(87) PCT Pub. No.: WO2008/023110
PCT Pub. Date: Feb. 28, 2008

(65) Prior Publication Data
US 2010/0089481 A1 Apr. 15, 2010

(30) Foreign Application Priority Data
Aug. 21, 2006 (FR) .................................... 06 07421

(51) Int. Cl.
*F16L 11/00* (2006.01)
(52) U.S. Cl.
USPC .............................. 138/130; 138/134; 138/135

(58) Field of Classification Search
USPC .......................................... 138/130, 134, 135
See application file for complete search history.

(56) References Cited

U.S. PATENT DOCUMENTS

| 2,083,937 | A | * | 6/1937 | Begg | 74/502.4 |
|---|---|---|---|---|---|
| 2,092,898 | A | * | 9/1937 | Tondeur | 464/174 |
| 3,240,082 | A | * | 3/1966 | Bratz | 74/502.5 |
| 4,213,485 | A | * | 7/1980 | Ottewell et al. | 138/130 |
| 5,645,110 | A | * | 7/1997 | Nobileau | 138/134 |

(Continued)

FOREIGN PATENT DOCUMENTS

| WO | WO 96/17198 A | 6/1996 |
|---|---|---|
| WO | WO 01/33129 A | 5/2001 |

(Continued)

OTHER PUBLICATIONS

International Search Report dated Jan. 29, 2008, issued in corresponding international application No. PCT/FR2007/001368.

*Primary Examiner* — James Hook
(74) *Attorney, Agent, or Firm* — Ostrolenk Faber LLP

(57) ABSTRACT

A flexible pipe and a method of producing it. The pipe has two tubular structures, internal and external, and a tubular axial blocking layer. The tubular blocking layer comprises two section wires each having a trapezoidal cross section. The trapezoidal cross section defines a base and two sloping lateral flanks. The base of one of the two section wires is oriented toward the internal tubular structure. The base of the other section wire is oriented in the opposite direction. The section wires are wound side by side forming contiguous coils. The internal tubular structure includes a wire having a wound structure to form transversely blocked coils. One of the two section wires is wound against said structure coils.

16 Claims, 5 Drawing Sheets

(56) References Cited

U.S. PATENT DOCUMENTS

| | | | |
|---|---|---|---|
| 6,415,825 B1 * | 7/2002 | Dupoiron et al. | 138/127 |
| 7,124,780 B2 * | 10/2006 | Dupoiron | 138/134 |
| 2004/0221907 A1 * | 11/2004 | Glejbol et al. | 138/129 |
| 2006/0048833 A1 * | 3/2006 | Glejbol et al. | 138/134 |

FOREIGN PATENT DOCUMENTS

| | | |
|---|---|---|
| WO | WO 01/81809 | 11/2001 |
| WO | WO 03/056224 | 7/2003 |
| WO | WO 03/083343 | 10/2003 |
| WO | WO 2006/042939 | 4/2006 |

* cited by examiner

FLEXIBLE PIPE HAVING HIGH RESISTANCE TO AXIAL COMPRESSION AND METHOD OF MANUFACTURING SUCH A PIPE

CROSS REFERENCE TO RELATED APPLICATION

The present application is a 35 U.S.C. §§371 national phase conversion of PCT/FR2007/001368, filed Aug. 13, 2007, which claims priority of French Application No. 0607421, filed Aug. 21, 2006, incorporated by reference herein. The PCT International Application was published in the French language.

BACKGROUND OF THE INVENTION

The present invention relates to a flexible pipe for carrying hydrocarbons or other fluids at high pressure, and to a method of producing such a pipe. More specifically, the invention relates to a flexible pipe that has high resistance to axial compression (axial compression strength).

Flexible pipes for carrying hydrocarbons are already well known and generally comprise, from the inside of the pipe outward, a metal carcass, to react to radial crushing forces, covered by an internal sealing sheath made of polymer, a pressure vault to withstand the internal pressure of the hydrocarbon, tensile pressure armor layers to react to axial tensile forces and an external sheath made of polymer to protect the entire pipe and, in particular, to prevent the ingress of seawater into its thickness. The metal carcass and the pressure vault are made of longitudinal elements wound with a short pitch, and give the pipe its ability to withstand radial forces, while the tensile pressure armor layers consist of metal wires wound with long pitches in order to react to axial forces. It should be noted that, in the present application, the idea of winding at a short pitch denotes any helical winding at a helix angle of close to 90°, typically ranging between 75° and 90°. The idea of winding at a long pitch for its part covers helix angles of below 55°, typically ranging between 25° and 55° in the case of tensile pressure armor layers.

These pipes are intended to carry hydrocarbons particularly along the seabed and to do so at great depths. More specifically, they are of the kind known as "unbonded" and are thus described in the Standards published by the American Petroleum Institute (API) API 17J and API RP 17B.

When a pipe, whatever its structure, is subjected to an external pressure that is higher than the internal pressure, compressive forces directed parallel to the axis of the pipe are generated in the wall of the pipe and have a tendency to shorten the length of the pipe. This phenomenon is well known by its English name of "reverse end-cap effect". The intensity of the axial compressive forces is proportional to the difference between the external pressure and the internal pressure. This intensity may reach very high levels in the case of a flexible pipe submerged at a great depth because the internal pressure may, under certain conditions, be very much lower than the hydrostatic pressure.

In the case of a flexible pipe of conventional structure, for example one in accordance with the API standards, the reverse end-cap effect has a tendency to introduce a longitudinal compressive force into the wires that make up the tensile pressure armor layers and to shorten the length of the flexible pipe. In addition, the flexible pipe is also subjected to dynamic loading particularly when it is installed or in use as what is commonly known in English as a "riser". All of these stresses may cause the wires of the tensile pressure armor layers to buckle and irreversibly disorganize the tensile pressure armor layers, thus destroying the flexible pipe.

Document WO 03/083343 describes a solution for increasing the axial compression strength of the tensile pressure armor layers of a flexible pipe. This solution consists in winding around the tensile pressure armor layers tapes that are reinforced, for example, with aramid fibers. This limits and controls the expansion of the tensile pressure armor layers. However, while this solution does solve the problems associated with the radial buckling of the wires that make up the tensile pressure armor layers, it merely lessens the risk of lateral buckling of said wires, which risk still remains.

Document WO 03/056224 describes a solution for reducing the risk of lateral buckling of the wires that make up the tensile pressure armor layers of a flexible pipe subjected to an axial compressive force. This solution consists in reducing the lateral clearances between wires and optionally in filling said clearances with a filling material. However, while this solution reduces the risk of lateral buckling it does not completely eliminate this risk. In addition, that solution has the disadvantage of significantly increasing the complexity and cost of manufacture of the tensile pressure armor layers, on account in particular of the tighter dimensional tolerances.

Document WO 2006/042939 also describes a solution for reducing the risk of lateral buckling. That solution consists in using wires that have a high width-to-thickness ratio and in reducing the total number of wires that make up each tensile pressure armor layer. However, while that solution reduces the risk of lateral buckling of the tensile pressure armor layers it does not completely eliminate it.

Document WO 01/81809 describes a solution that consists in producing the pressure vault of the pipe from K-shaped interlocked wires, and in using said pressure vault as a mechanical end stop to react to axial compressive forces. In addition, the tensile pressure armor layers are free to expand because there is no external sealing sheath nor is there any reinforcing layer capable of restricting the extent to which they expand. When a pipe such as this is subjected to an axial compressive force, it shortens until such point as the axial clearances separating the coils of the pressure vault become zero and said coils come into abutment against one another, in which configuration said pressure vault is able to react to most of the axial compressive force. The tensile pressure armor layers accommodate the shortening by expanding, and make practically no contribution toward reacting to the axial compressive force. In practice, the shortening of such a pipe is generally great, typically of the order of 5% of its length. This order of magnitude is a direct result of the geometry of the pressure vault and, more particularly, of the ratio between, on the one hand, the combined length of the axial clearances separating the coils and, on the other hand, the overall length of the pipe. This is an indirect result of the general design rules disseminated by the API Standards, said rules being aimed amongst other things at minimizing the bend radius at which the pipe can be bent without suffering damage, this being with a view to making handling and storage operations easier. Now, the fact that such a pipe can shorten so substantially when subjected to a reverse end-cap effect, presents a number of problems. First, this shortening causes a significant expansion of the tensile pressure armor layers with a risk of irreversibly disorganizing these, particularly if the pipe is at the same time loaded in dynamic bending. By way of example, a tensile pressure armor layer manufactured with a helix angle of 35° is expanded by almost 10% when shortened by 5%. Under the same shortening conditions, a tensile pressure armor layer manufactured with a helix angle of 25° is expanded by the order of 20%. With such levels of relative expansion, the radial displacements of the wires may be 5 to 10 times greater than their own thickness, which goes some way to explaining the risk of disorganization of the tensile pressure armor layers. Another disadvantage with the potential shortening is that a pipe such as this has a tendency to straighten itself out when subjected to a reverse end-cap effect, thus generating instabilities and bending movements that could have damaging effects particularly at connections with underwater equipment.

Document WO 96/17198 describes, particularly in FIG. 18, a flexible pipe comprising a tubular axial blocking layer able to react to axial compressive forces and to limit the shortening of the pipe, thus avoiding damage to the tensile pressure armor layers.

This tubular axial blocking layer comprises two section wires of trapezoidal shape, wound at a short pitch and resting against one another along their inclined flanks so as to form contiguous coils. The flexibility of this layer lies in the relative radial mobility of the two wires that can slide one along the other along their inclined flanks. This layer is positioned around the internal sealing tube so that it also acts as a pressure vault. However, tests have shown that a pipe such as this presents a risk of damage when simultaneously subjected to a high axial compressive force and to repeated reverse-cycle bending stresses, as may be the case with the bottom part of risers near the point of contact with the sea bed. This damage relates more specifically to the axial blocking layer which may gradually become disorganized and lose all or some of its flexibility, thus causing the pipe to be destroyed.

Hence, one problem that arises and that the present invention addresses is that of providing a flexible pipe which is not only capable of withstanding a great deal of axial compression without shortening, but which is also capable durably of withstanding repeated reverse-cycle bending stresses while at the same time maintaining its flexibility and integrity. Furthermore, it is desirable for this pipe to be able to be bent to small bend radii.

SUMMARY OF THE INVENTION

With a view to solving this problem, the present invention proposes a flexible pipe for carrying hydrocarbons, said pipe has two coaxial tubular structures, an internal one and an external one respectively. A tubular axial blocking layer is located between said tubular structures, said tubular blocking layer comprises at least two section wires helically wound with a short pitch, said at least two section wires each have a substantially isosceles trapezoidal cross section. The trapezoidal cross section defines a base and two opposing lateral flanks that are inclined relative to one another. The base of one of said at least two section wires is directed toward the internal tubular structure while said base of the other of said at least two section wires is directed away from said internal tubular structure. The at least two section wires are wound, lateral flank against lateral flank, forming contiguous coils so as to block said pipe axially in compression. The contiguous coils define two mating surfaces that are inclined with respect to the axis of said pipe. According to the invention said internal tubular structure comprises a structural wire wound at a short pitch to form structural coils that are transversely blocked relative to one another. One of said at least two section wires is wound pressing against said structural coils so that the bending deformation of said tubular blocking layer simultaneously causes relative axial movement of said structural coils and relative transverse displacement of said contiguous coils along said inclined mating surfaces so as to allow said pipe to bend.

Thus, one feature of the invention lies in the means of collaboration of the internal tubular structure and of the tubular axial blocking layer and, more specifically, of the structural coils that can move axially with the contiguous coils which are themselves capable of transverse movement relative to one another. In that way, the ability of the pipe to withstand the combination of strong axial compression with reverse-cycle bending stresses is improved. The axial blocking layer is stabilized by its collaboration with the structural coils of the internal tubular structure and durably maintains its integrity without becoming disorganized. Furthermore, this pipe is capable of withstanding a great deal of axial compression without shortening, because of the presence of the tubular axial blocking layer. Finally, this pipe maintains a flexibility similar to that of pipes of the prior art. The pipe is allowed to bend because the structural coils of the internal tubular structure can move closer together on the inside of the bend while they move further apart from one another on the diametrically opposite outside of the bend, and at the same time the contiguous coils are able to undergo a transverse displacement relative to one another, forming a kind of ball joint.

Advantageously, the internal tubular structure comprises a structural wire consisting of an interlocking wire, for example a shaped wire of the zeta, theta or C-shaped type which therefore allows the interlocked structural coils some degree of axial clearance both in terms of compression and in terms of elongation within set limits as will be explained in detail later on in the description.

Furthermore, said at least one section wire and said structural wire are advantageously cross-wound. This makes it possible to balance out the torques applied to the pipe by these two layers.

Further, the lateral flanks of said at least one section wire are inclined with respect to said internal surface by an angle ranging between 50° and 70°, thus improving the compression strength of the pipe while at the same time maintaining good flexibility. This point will be explained later on. In the present application, by convention, the angle of inclination between two concurrent straight lines is the absolute value of the angular aperture of the smallest of the four angular sectors defined by the intersection of the two straight lines. It therefore always ranges between 0° and 90°.

According to a particularly advantageous first embodiment of the invention, said one of said at least two section wires, or the first one, has a height greater than the height of said other of said at least two section wires, or the second one. Thus, the coils of said first section wire are radially blocked between the internal and external tubular structures while those of said second section wire are able to move radially. In addition, advantageously, the base of said first section wire rests against said structural coils of said internal tubular structure. Thus, the structural coils on which the coils of said first section wire are wound are able to make those too move axially. This is then able to cause the coils of said second section wire to move transversely. Toward the inside of the bend in the pipe, the coils of said second section wire tend to be driven toward the outside of the pipe between the lateral flanks of said first section wire, whereas opposite, toward the outside of the bend, the coils of said second section wire become more closely nested toward the inside of the pipe between the lateral flanks of said one of said two section wires. As a result, the flexible pipe is axially blocked against contraction while at the same time remaining flexible.

This embodiment greatly reduces the risk of disorganization of the blocking layer and increases the strength and durability of the pipe. This improvement is a result of the effectiveness of the way in which the blocking layer and the structural coils of the internal tubular layer cooperate. The risk of disorganization of the blocking layer is associated with the forces generated by friction on the lateral flanks of the contiguous coils. The forces in particular having a tendency to offset the coils with respect to the axis of the pipe. Now, only the coils of said first section wire rest against the structural coils of the internal tubular structure. Further, this bearing contact is particularly stable and can withstand significant radial forces. This is because the structural coils have great radial rigidity. In addition, when the pipe is bent, there is practically no slippage between, on the one hand, the structural coils and, on the other hand, the coils of said first section wire. Thus, significant radial forces can be transmitted through this bearing contact without thereby generating at this bearing contact any wear, seizure or frictional forces that could be detrimental to the correct operation of the pipe. Finally, advantageously, the bearing contact is via the base, rather than via the top, of said first section wire, thus further improving stability. The coils of said second section wire, for their part, are not in permanent contact with the structural coils and do not therefore benefit directly from the stabilizing effect thereof. However, they do benefit from an indirect stabilizing effect associated with the permanent contact, at their lateral flanks, with the coils of said first section wire. Quite surprisingly it also appears that this indirect effect is enough to correctly stabilize the coils of said second section wire.

As a preference, for each of said section wires, the width of said base is greater than 1.4 times said height. Thus, said section wires keep a base that is suitably parallel to the axis of the pipe, the risks of tilting being reduced. Thus, the stability of the blocking layer is improved.

Pipe performance is further improved, as will be explained later on, when one of said two section wires has a height ranging between 1.2 and 1.6 times the height of the other of said two section wires.

Further, said one of said two section wires has a cross section having an area which ranges between 0.8 and 1.5 times the area of said other of said two section wires so that the strengths of the two wires are similar. Thus, as will be explained later on, the weight of the tubular blocking layer can be reduced while at the same time maintaining sufficient ability to withstand axial compression forces.

Further, the base and the top of said one of said two helically wound section wires respectively define two coaxial tubular envelopes spaced apart. Advantageously, said other of said two section wires extends substantially equidistant from said tubular envelopes when said flexible pipe extends longitudinally in a rest position. This makes it possible to increase the flexibility of the pipe by reducing the minimum radius of curvature that the blocking layer can withstand without sustaining damage.

According to another aspect, the present invention also relates to a method of producing a flexible pipe, said pipe having two coaxial tubular structures, these being an internal one and an external one respectively, and a tubular axial blocking layer located between said tubular structures. The method is of the type whereby there are provided two section wires each having a substantially isosceles trapezoidal cross section. The trapezoidal cross section defines a base and two opposing lateral flanks that are inclined relative to one another. One of said two section wires is helically wound with a short pitch so that said base is directed toward the internal tubular structure, forming first coils spaced apart, while the other of said at least two section wires is helically wound between said spaced-apart first coils, and its base is directed away from said tubular structure and lateral flanks against lateral flanks, forming contiguous coils in order to block said pipe axially in compression. The contiguous coils define two mating surfaces that are inclined relative to the axis of said pipe. According to the invention, said method further comprises the following steps: a) at least one structural wire is provided; b) said at least one structural wire is wound at a short pitch to form structural coils that are transversely blocked relative to one another; and c) said one of said two section wires is wound pressing against said structural coils. The bending deformation of said tubular blocking layer is capable simultaneously of causing the relative axial movement of said structural coils and the relative transverse displacement of said contiguous coils along said inclined mating surfaces so as to allow said pipe to bend.

Thus, one feature of the invention according to this other aspect lies in the use of at least one structural wire that is wound at a short pitch to form structural coils solid with one another so as to form an internal tubular structure that has great radial rigidity and around which at least one section wire can be wound. In that way, the rigid internal tubular structure forms a bearing surface onto which said section wire can be formed and wound.

Advantageously, in step a), there is provided an interlocking wire that forms said at least one structural wire and, in step b), said interlocking wire is wound in such a way as to form coils that are interlocked with one another. In that way, the coils of the interlocked wire are solid with one another over their entire circumference and are translationally blocked in a transverse direction. For preference, the structural wire is wound in one direction in step b), and said at least one section wire is wound in an opposite direction in step c), so that said at least one section wire and said structural wire cross. Thus, torques applied to the pipe by, on the one hand, the blocking layer and, on the other hand, the coils of the structural wire are in opposite direction and have a tendency to balance one another.

According to another embodiment of the invention that allows the section wires to be fitted correctly and when these exhibit unevennesses, step c) involves the following steps: two section wires of substantially isosceles trapezoidal section are provided. The section wires having a base, and a top opposite, said lateral flanks corresponding to the non-parallel surfaces of said section wires. One of said two sections is wound on said internal tubular structure, resting the base of said one of said sections against the internal tubular structure so as to form coils that are spaced apart by a first pitch. The other of said two sections is wound between said spaced-apart coils, pressing the top of said other of said two sections toward said tubular structure so that the bases of said two sections face in opposite directions to one another. Finally, the other of said two sections is pushed in so as to separate said coils by a pitch greater than the first pitch. As far as possible, the other of said two sections is pushed in so as to fit it equidistant from the base and from the top of said one of said two sections.

As a preference, when the second section wire has been pushed too deeply between the two consecutive coils of the first section wire, said one of said two sections is then made to move translationally in order to cause said coils to move closer together in such a way as to separate said other of said two sections from said tubular structure and thus reposition it equidistant from the base and from the top of said one of said two sections.

What is more, according to one particularly advantageous embodiment of the invention, step c) involves the following steps: two section wires of substantially isosceles trapezoidal section are provided, said section wires having a base, and a top opposite, said lateral flanks corresponding to the non-parallel surfaces of said section wires; then one of said two sections is wound on said internal tubular structure, resting the base of said one of said sections against the internal tubular structure so as to form coils that are spaced apart by a set distance; said coils are then kept at said set distance; and the other of said two sections is then wound between said spaced-apart coils, pressing the top of said other of said two sections toward said tubular structure so that the bases of said two sections face in opposite directions to one another. This particular embodiment will be described in greater detail in the detailed description that will follow.

Other particulars and advantages of the invention will become apparent from reading the description given hereinbelow of some particular embodiments of the invention which are given by way of nonlimiting indication with reference to the attached drawings in which:

DESCRIPTION OF PREFERRED EMBODIMENTS

Figure 1:
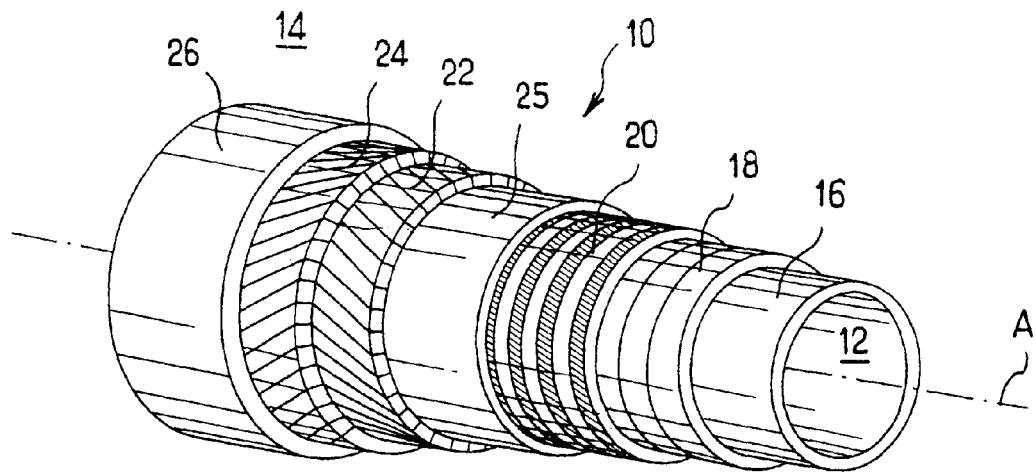
FIG. 1 is a perspective partial schematic view of a flexible pipe according to the invention.

FIG. 1 illustrates a flexible pipe 10 according to the invention, of the "smooth-bore" type and which here has, from the inside of the pipe 12 out toward the outside 14, an internal sealing sheath 16 made of plastic, an interlocked pressure vault 18, a tubular blocking layer 20, two crossed tensile pressure armor layers 22, 24 separated from the tubular blocking layer by an intermediate sheath 25, and an external sealing sheath 26. The flexible pipe 10 thus extends longitudinally along the axis A. The interlocked pressure vault 18 and the tubular blocking layer 20 are produced from longitudinal elements helically wound with a short pitch to form coils which, in the case of the pressure vault 18 are non-contiguous and, in the case of the tubular blocking layer 20 are contiguous, while the crossed tensile pressure armor layers 22, 24 are formed of long-pitch helical windings of metal wires.

In other types of structure of the "rough-bore" type a metal carcass is fitted inside the internal sealing sheath 16 and the intermediate sheath 25 is omitted.

Figure 2:
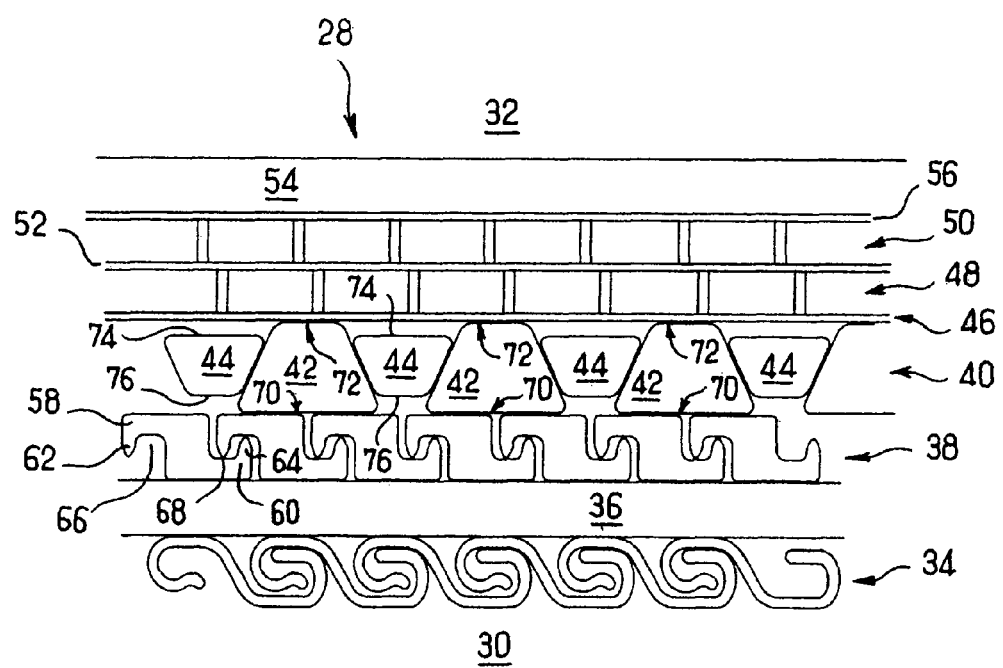
FIG. 2 is a partial schematic view in axial section of a portion of the flexible pipe illustrated in FIG. 1.

This is the case with the pipe portion 28 depicted in axial half-section and illustrated in FIG. 2. It has, from the inside 30 toward the outside 32, a carcass 34 formed of a profiled metal strip wound in coils that interlock with one another and are able to react radial crushing forces, a sealing sheath 36 made of plastic, a pressure vault 38 made of a zeta-shaped wire helically wound with a short pitch and interlocked; a tubular blocking layer 40 which in this instance has two sections 42 and 44 on which details will be provided later, a first anti-wear tape 46, two pressure armor wires 48 and 50 separated by a second anti-wear tape 52, and an external sheath 54 made of plastic separated from the tensile pressure armor wires by a retaining tape 56. The anti-wear tapes are designed to limit wear and friction between adjacent metallic layers. The sole purpose of the retaining tape is to hold the tensile pressure armor layers in position while the pipe is being manufactured until such time as the external sheath is fitted. This retaining tape differs in its structure and in its function from the aramid-fiber reinforced tapes described in WO 03/083343. It has far less mechanical strength and would not be capable in service of limiting or of controlling the expansion of the tensile pressure armor layers under conditions similar to those described in WO 03/083343. The zeta-shaped wire has two opposite edges 58 and 60 each respectively ending in returns 62, 64 delimiting two opposing grooves 66 and 68. As for the tubular blocking layer 40, it has a first section wire 42 and a second section wire 44 of lesser height, both of substantially isosceles trapezoidal cross section. The first section wire 42 has a first base 70 also termed the internal surface, and, opposite this, a first top 72, and the second section wire 44 has a second base 44, opposite a second top 76. Further, as will be explained in greater detail hereinbelow, the two section wires 42 and 44 have a cross section with, respectively, two lateral flanks inclined toward one another by an angle relative to their respective base 70, 74, these angles being substantially equal.

In certain specific applications it is advantageous to form substantially convex lateral flanks in the first section wire 42 and, accordingly, to form concave lateral flanks in the second section wire 44. This is because this creates spherical bearing surfaces between the adjacent section wires thus facilitating relative ball joint-type movements to accompany the bending of the pipe, and reducing contact pressures. The ideal curvature for each lateral flank, when viewed in cross section, is a circle centered on the intersection between the axis of the pipe and the right bisector of said lateral flank. In practice, for pipes destined for waters less than 2500 m deep, the ratio between the thickness of the axial blocking layer and the diameter of the pipe is such that the radius of this circle is very much greater than the height of the section wire.

This being the case, the maximum difference between, on the one hand, an optimally curved flank and, on the other hand, a straight inclined flank is negligible and does not justify making this improvement. Because of this small maximum difference, which is of the order of a few 100ths of a millimeter, the phenomenon whereby the parts wear and grind one another naturally creates spherical bearing surfaces close to the optimal bearing surfaces. However, this improvement is advantageous in the case of pipes destined to be submerged at very great depths, typically in excess of 3500 m, and which are therefore subjected to extremely high axial compressive forces.

As depicted in FIG. 2, the pipe 28 extends longitudinally in a position of rest. It will be noted that, in this position of rest, the first section wire 42 which forms coils around the pressure vault 38, has its first base 70 bearing against the coils of the pressure vault 38, while the pressure armor wires 48 and 50 and the first anti-wear tape 46 themselves bear against the first top 72, whereas the second section wire 44 is inset like a wedge between the coils formed by the first section wire 42. The second base 74 and the second top 76 of the second section wire 44 then respectively face in the opposite directions from the first base 70 and from the first top 72 of the first section wire 42. Because the height of the second section wire 44 is less than that of the first section wire 42, this second section wire 44 is helically wound between the coils of the first section wire 42, flank against flank, so that its second top 76 and its second base 74 are respectively spaced substantially equidistant from the pressure vault 38 and from the first anti-wear tape 46. What is more, it will be noted that, in this position of rest, the return 62, 64 of the opposite edges 58 and 60 of the zeta-shaped wire are respectively engaged at the middle of their contiguous grooves 68, 62. Thus, the pressure vault 38 has axial clearance both for compression and for elongation.

In addition, the coils of the first section wire 42 bear against the pressure vault 38 either directly as depicted in FIG. 2 or via a tape made of synthetic material, so that the forces of friction between the section wire 42 and the zeta-shaped wire of the pressure vault 38 are great enough that the axial movement of the coils of the pressure vault 38 is capable of causing the coils of the first section wire 42 to move. What is more, by virtue of this tubular blocking layer 40 it will be appreciated that any axial stress tending to contract the pipe 10 as illustrated in FIG. 1 will be reacted by the coils of the two section wires 42, 44 bearing flank to flank. This axial compression, because of the wedge effect produced by the inclination of the flanks, generates in the two section wires circumferential or hoop stresses in opposite directions, which tend to cause the diameter of the coils of the first section wire 42 to reduce slightly and tend to cause those of the second section wire 44 to increase slightly. The blocking layer is designed in such a way that these stresses never exceed the yield stress of the wires, which means that deformation remains reversible and small. In practice, when axial compression is applied, the blocking layer and the pipe can shorten reversibly by a relative amount less than 0.3% and advantageously less than 0.15%. This being the case, the extent to which the tensile pressure armor layers expand remains, in relative terms, less than about 0.6%. Thus the radial movements of the tensile pressure armor wires remain markedly smaller that their own thickness, thus preventing any risk of the tensile pressure armor layers becoming disorganized.

Figure 3:
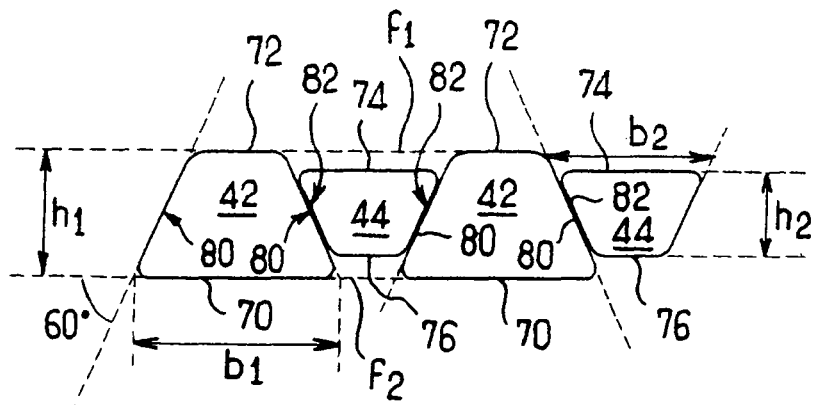
FIG. 3 is a schematic detail view showing two elements depicted in FIG. 2.

Reference is now made to FIG. 3 which is a partial view in axial half-section showing the flexible pipe in a rest position and showing in cross section the section wires, two coils of the first section wire 42 and of the second section wire 44, nested between one another. The geometry, construction and arrangement of the two section wires 42, 44 with respect to one another in the tubular blocking layer 40 will be described with the support of this FIG. 3.

These section wires 42, 44 are made of steel and formed by drawing or cold rolling so as to obtain wires with good mechanical properties and good dimensional tolerances at an attractive cost. The tensile yield strength of the wires thus produced is advantageously in excess of 800 MPa. Furthermore, as will be explained hereinafter, their surface finish must be good enough to allow one wire to slip relative to another. Advantageously, the mean roughness Ra of the lateral flanks of the wires is less than 3.2 µm. For preference, the lateral flanks are coated with a grease in order to reduce the coefficients of friction still further.

FIG. 3 shows the first section wire 42 with its first base 70 and its first top 72 and two opposing lateral flanks 80. It also shows the second section wire 44 with its second base 74 and its second top 76 and two opposing lateral flanks 82. The dimensions of the section wires 42, 44 are tailored to suit, in particular, the diameter of the flexible pipe, the minimum bend radius to which the pipe has to be bent, and the depth of water in which it is to be used.

Thus, the angles of inclination between, on the one hand, the opposing lateral flanks 80 and the first base 70 and, on the other hand, the opposing lateral flanks 82 and the second base 74, are substantially equal and range between 50° and 70°, advantageously 55° and 65°, and are optimally close to 60°, making it possible to obtain a blocking layer that has both good compressive strength and good flexibility. Specifically, as these angles increase toward 90°, the wedge effect becomes smaller, the circumferential or hoop stresses in the section wires are therefore lower and the axial compressive strength of the blocking layer is improved. However, at angles of beyond 75°, there is a risk of seizure and blockage through a lack of slippage between the lateral faces of the section wires. In addition, once the heights h1, h2 of the two section wires 42, 44 have been fixed, a reduction in the angle reduces the minimum bend radius to which the blocking layer can be bent without sustaining damage, and this amounts to stating that the flexibility of the blocking layer improves the smaller this angle. In the end analysis, an angle of around 60° offers an optimal compromise.

In addition, the corners of the section wires 42, 44 are rounded or chamfered so that their relative movement does not damage the adjacent layers and their relative slippage occurs with the least possible amount of friction.

For preference, the width b1 of the base of the first section wire 42 is greater than 1.4 times its height h1. Likewise, advantageously, the width b2 of the second section wire 44 is greater than 1.4 times its height h2. This improves the stability of the section wires 42, 44 as they durably keep their base parallel to the axis of the pipe when the latter extends longitudinally.

The height h1 of the first section wire 42 advantageously ranges between 1.2 and 1.6 times the height h2 of the second section wire 44. This is because once all the other parameters have been set, an increase in the h1/h2 ratio has the effect of increasing the flexibility of the blocking layer through the increase in the amount of radial displacement of the second section wire h2 with respect to the first section wire h1. However, this increase reduces the cross section of the second section wire and therefore the compressive strength of the blocking layer. In the end analysis, the best compromise is obtained when h1/h2 ranges between 1.2 and 1.6.

Furthermore, the first section wire 42 advantageously has a cross section the area of which ranges between 0.8 and 1.5 times the area of the cross section of the second section wire 44. In that way, the compressive and tensile circumferential or hoop stresses experienced by the section wires 42 and 44 respectively are even and of similar magnitude. This allows the blocking layer to be improved by reducing its weight for the same axial compressive strength.

For preference, the cross-sectional area, of the first section wire 42 ranges between 1 and 1.3 times, and is, for example, 1.2 times, the cross-sectional area of the second section wire 44.

The first section wire 42 has, for example, a height h1 ranging between 4 mm and 14 mm and a first base 70 width b1 ranging between 6 mm and 24 mm, for pipes of inside diameter ranging between 100 mm and 250 mm to be submerged at depths of between 1000 and 1500 m of water. Under the same conditions, the height h2 of the second section wire 44 ranges, for example, between 2.5 mm and 11 mm and the width b2 of the second base 74 ranges between 7.5 mm and 27 mm.

Thus, for example, for a flexible pipe with an internal diameter of 150 mm, intended to be submerged at a depth of 1500 m, the height h1 of the first section wire 42 is 8.2 mm, the width b1 of the first base 70 is 14.1 mm, the height h2 of the second section wire 44 being 6 mm and the width b2 of the second base 74 being 16.2 mm.

As has already been expressed hereinabove, when the flexible pipe extends longitudinally in a position of rest, the coils of the first section wire 42 and of the second section wire 44 respectively define two coaxial envelopes. In addition, advantageously, the second section wire 44 lies equidistant from the first base 70 and from the first top 72 of the first section wire 42, this having the advantage of reducing the minimum bend radius of the blocking layer. As a result, taking the aforementioned example again, and with reference to FIG. 3, the second base 74 and the second top 76 of the second section wire 44 need to be spaced respectively by a distance of 1.1 mm from a first line F1 defined by the first top 72 of the first section wire 42 and from a second line F2 which defines the first base 70 of the first section wire 42. The way in which this coaxiality is obtained will be explained in greater detail with reference to the method of producing the flexible pipe.

Figure 4:
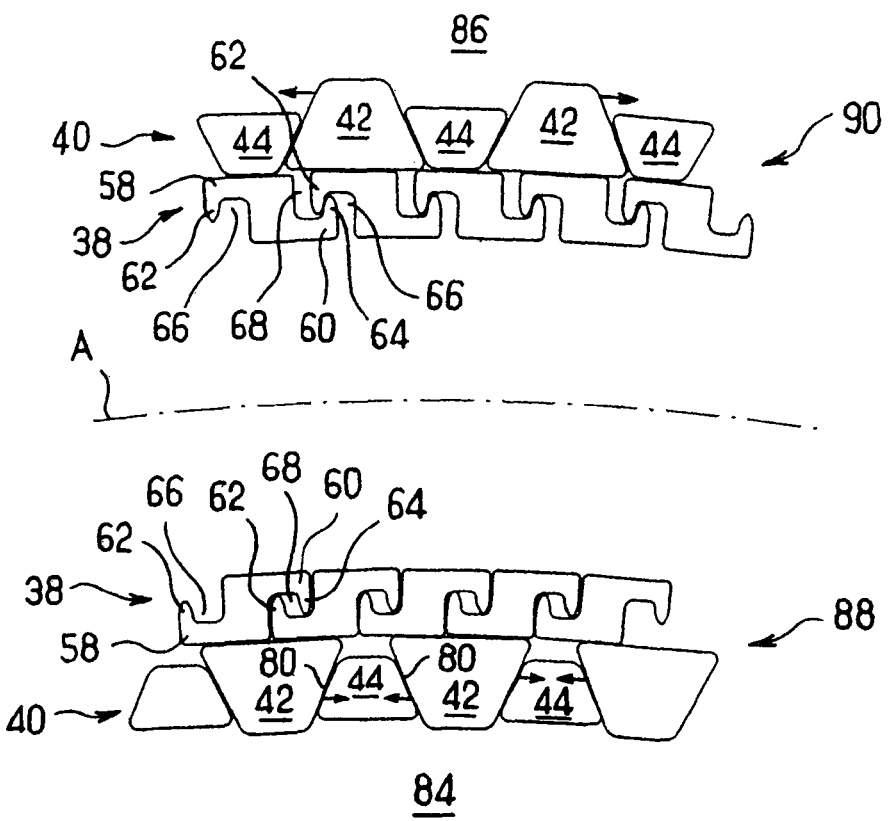
FIG. 4 is a partial schematic view in axial section of elements depicted in FIG. 1, in an active position.

Reference will now be made to FIG. 4 which depicts, in axial section, a portion of a pipe according to the invention and only its pressure vault 38 against which its tubular blocking layer 40 rests. This assembly is depicted in conditions in which the pipe is bent, defining an inside of the bend 84 and an outside of the bend 86. Thus, toward the inside of the bend 84 a first portion of pipe 88 is contracted whereas toward the outside of the bend 86 a diametrically opposite second portion of pipe 90 is extended. The structural impact on the pressure vault 38 and on the tubular blocking layer 40 and the relative displacement of their respective elements will be explained hereinbelow.

Thus, toward the inside of the bend 84, the first portion of pipe 88 is contracted and the coils of the zeta-shaped wire are butted against one another, whereas on the opposite side, towards the outside of the bend 86, the second portion of pipe 90 is extended, the returns 62, 64 of the opposing edges 58, 60 being respectively engaged with one another. Also, in the first portion of pipe 88 the coils are close together whereas in the second portion 90 the coils are further apart. As a result, because the first section wire 42 is helically wound pressing against the pressure vault 38, the coils of the zeta-shaped wire have at the same time carried along with them the coils of the first section wire 42 such that in the first portion of pipe 88 the coils of the first section wire 42 have been moved closer together whereas, on the opposite side, in the second portion of pipe 90, the coils of the first section wire 42 have been moved further apart. This then has the mechanical effect of carrying the coils of the second section wire 44 transversely toward the inside of the bend 84. Specifically, in the first portion of pipe 88, the coils of the first section wire 42, the lateral flanks 80 of which are inclined, have moved closer together and driven the coils of the second section wire 44 toward the inside of the bend 84, the coils sliding along mating surfaces defined by the lateral flanks 80, 82. At the same time, in the second portion of pipe 90 on the opposite side, because the coils of the first section wire 42 have moved apart, the coils of the second section wire 44 slide flank-to-flank between the coils of the first section wire 42 toward the pressure vault 38.

Thus, the pipe 10 is allowed to bend without any overall shortening of this pipe, the coils of the two section wires 42, 44 thus acting like ball joints relative to one another. These bendings are limited in terms of their amplitude only by the second top 76 of the second section wire 44 coming to bear against the pressure vault and, at the same time, on the opposite side, by the second base 74 of the second section wire 44 coming to bear against the tensile pressure armor layer 48 and the anti-wear sheath 46.

According to a first alternative embodiment of the invention, and this has not been depicted, the section wires 42, 44 are wound in such a way that their respective base and top are the other way around with respect to the pressure vault 38, as illustrated in FIG. 2. Furthermore, and according to a second alternative form of embodiment, there is provided a first section wire in two parts symmetric with one another with respect to a midplane, so as to make assembly easier. Advantageously, and according to a third alternative form of embodiment, the section wires have longitudinal cavities in their base and/or in their top, and on the inside of their contact face in the case of a first section wire made in two symmetric parts, leaving the lateral flanks intact, so as to make the tubular blocking layer lighter without adversely affecting the functional parts thereof.

The flexible pipe according to the invention is produced using a method that will be described hereinbelow with reference to FIGS. 5 to 7. These figures schematically depict in axial half-section a flexible pipe of the kind illustrated in FIG. 2 when it is in the process of being produced. Hence, the references that relate to identical elements will be annotated with a prime "'" symbol. A pipe such as this is produced layer-by-layer from the inside outward. The carcass 34' is manufactured by helically winding and interlocking a metal section strip. Next, the sealing sheath 36' is manufactured by extrusion. The next step is to manufacture the pressure vault 38' by short-pitch helical winding of one or more wires, using what is commonly known in English as a "spiraling machine". Thereafter, the blocking layer 40' is manufactured using a spiraling machine according to a method that will be detailed hereinbelow. To finish off, the other layers, namely, on the one hand, the tensile pressure armor layers 48', 50', the various anti-wear tapes 46', 52' and retaining tape 56' and, on the other hand, the external sheath 54' are manufactured in the conventional way, using the helical winding of wires or tapes, or using extrusion, respectively.

FIG. 5 again shows a carcass 34' covered with a pressure sheath 36' onto which a zeta-shaped wire that forms a pressure vault 38' is spiral wound, these layers having already been manufactured in the conventional way. The blocking layer 40' is depicted in the process of being manufactured, as it passes through the spiraling machine. The spiraling machine is stationary and the pipe is translationally driven in the direction of the arrow F. As it leaves the spiraling machine, the blocking layer 40' is formed. First of all, and in a first step, the first section wire 42' is wound in a helix around the pressure vault 38' under controlled tension, so as to tighten the coils thus formed and make them solid with the pressure vault 38'. The base 70' of the first section wire 42' is mounted resting against the pressure vault 38'. Furthermore, the pitch of the helix Pr of the first section wire 42' is precisely controlled.

Figure 6:
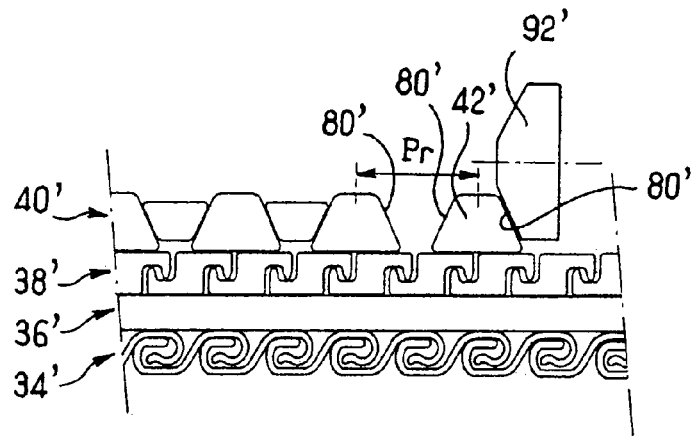
FIG. 6 is a partial schematic view illustrating a second step in producing the flexible pipe according to the invention.

Next, and in a second step illustrated in FIG. 6, the last coil of the spiral-wound first section wire 42' is blocked in terms of axial translation by pressing roller-forming means 92' against a lateral external flank 80' of the first section wire 42' of this last coil.

Figure 7:
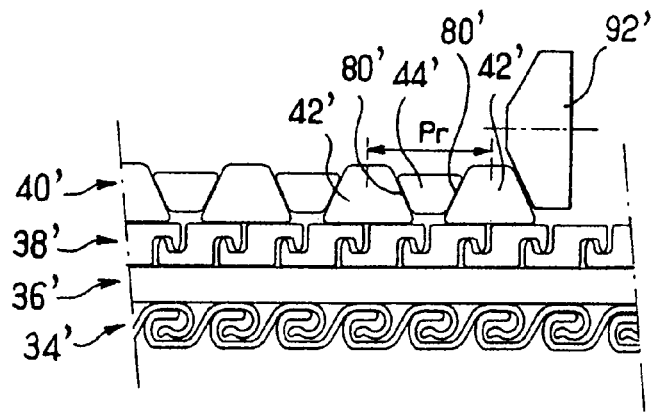
FIG. 7 is a partial schematic view illustrating a third step in producing the flexible pipe according to the invention.

Next, in a third step illustrated in FIG. 7, a new coil of the second section wire 44' is wound under controlled tension between the two free lateral flanks 80' of the first section wire 42'. This new coil of the second section wire 44' then fits precisely between the base and the top of the first section wire 42'. The fact that, on the one hand, the cross section of the section wires 42' and 44' is constant and that the position of the last coil of the first section wire 42' is kept at a constant distance corresponding to the pitch Pr during the production process makes this fit all the more precise. The roller 92' keeps this pitch Pr constant while the second section wire 44' is being inserted between the coils of the first section wire 42'. Specifically, because of the wedge effect, the laying tension exerted on the second section wire 42' produces a force that tends to separate the last two coils of the first section wire 44', and this force is partially reacted by the roller 92'.

The process used to produce the tubular blocking layer 40' is a continuous process and the two section wires 42' and 44' are wound simultaneously around the pressure vault 38' as the spiraling machine rotates. The roller or rollers 92' that form means of controlling the separation of the coils are mounted solid with the cage of the spiraling machine so that they constantly remain close to the point of laying of the second section wire 42'.

Advantageously, the spiraling machine is of the kind described in document WO 02/081111. This is because that spiraling machine comprises motorized linear hauling devices onboard the rotating cage which feed the section wires 42', 44' as far as their lay point with precise control over the laying tension. In addition, control over the laying tension guarantees the quality with which, on the one hand, the base of the first section wire 44' rests against the pressure vault 38' and with which, on the other hand, the lateral flanks 80', 82' of the two section wires 42', 44' rest against one another. Now, the quality of this resting contact is of key importance to the reliability and durability of the axial blocking layer.

A method of producing a pipe according to the invention using another embodiment, again in three steps, is now described with reference to FIGS. 8 to 10.

Figure 5:
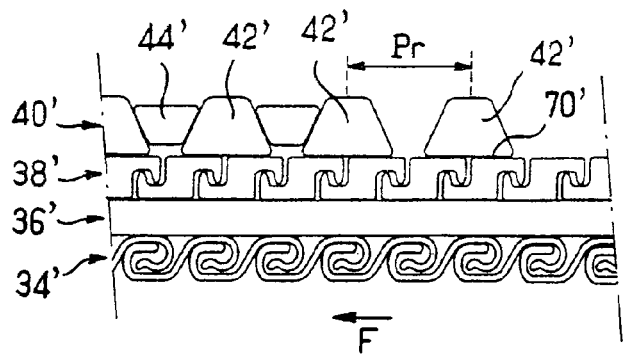
FIG. 5 is a partial schematic view illustrating a first step in producing a flexible pipe according to the invention.
Figure 8:
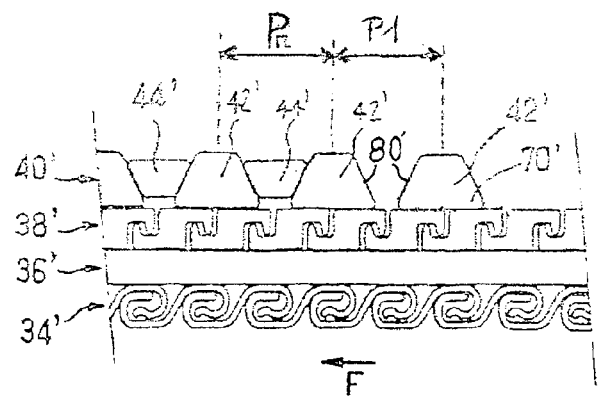
FIG. 8 is a partial schematic view showing a first step of another embodiment for producing a flexible pipe.

Thus, with reference to FIG. 8, which shows the same elements as those shown in FIG. 5, and which have been assigned the same references, the section wire 42' is originally spiral wound in a first step, using the spiraling machine, at a helix pitch P1 shorter than the helix pitch Pr of the section wire 42' in its definitively installed state, and advantageously P1 is slightly less than Pr, for example by five to ten percent. By virtue of the spiraling machine, by varying its rotational speed to suit the advance of the flexible pipe passing through it, the length of the helix pitch can be altered. Thus, by reference to the combined speeds, namely the rotational speed of the spiraling machine and the speed of advance of the flexible pipe, that causes the first section wire 42' to be wound at a pitch Pr, the new helix pitch P1 is obtained either by increasing the speed of the spiraling machine or by decreasing the speed of advance of the flexible pipe.

Figure 9:
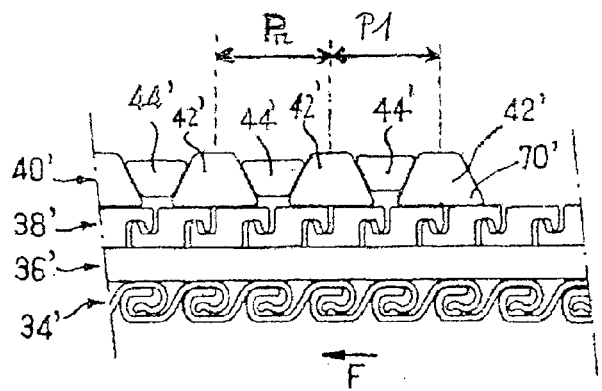
FIG. 9 is a partial schematic view illustrating a second step of said other embodiment.

At the same time, and in a second step illustrated in FIG. 9, the second section wire 44' is wound forming a new coil between the two free lateral flanks 80' of the first section wire 42'. This new coil of the second section wire 44' then fits no longer precisely between the base and the top of the first section wire 42' but rather toward the top of the first section wire 42' with an original helix pitch P1 substantially identical to helix pitch of the first section wire 42'.

Figure 10:
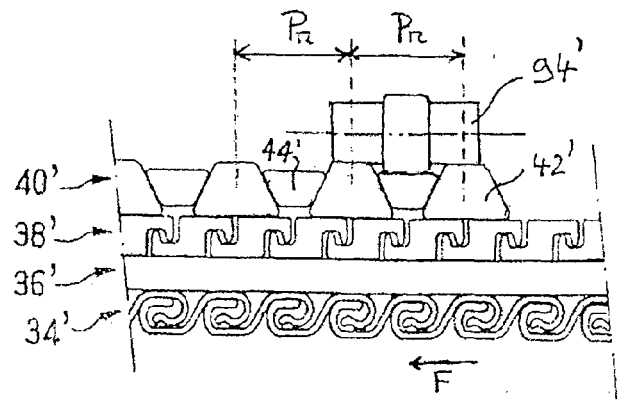
FIG. 10 is a partial schematic view illustrating a third step of said other embodiment.

Then, in a third step illustrated in FIG. 10, this new coil of the second section wire 44' is brought exactly between the base and the top of the first section wire 42' using a roll 94'. This roll 94', with cylindrical symmetry of revolution, has two identical bearing surfaces symmetric to one another with respect to a central collar. It is mounted to rotate about an axis substantially parallel to the axis of the flexible pipe. The central collar is of a width appreciably smaller than half a helix pitch P1 and of a radial thickness substantially equal to half the distance between the height h1 of the first section wire 42' and that h2 of the second section wire 44'.

Thus, according to this third step in which the roll 94' is pressed forcibly against the tubular blocking layer 40' so that its two identical bearing surfaces bear respectively against two consecutive coils of the first section wire 42' while the central collar fits precisely between these two consecutive coils, the roll 94' precisely forces the second section wire 44' in between the two consecutive coils of the first section 42'. The second section wire 44' is then pushed in to a depth that is set by the radial thickness of the collar. Further, given this radial thickness, which measures half the difference between h1 and h2, the second section wire 44', by bearing against the first of the two consecutive coils of the first section wire 42', tends, by forming a wedge, to separate the last coil of the first section wire 42', to bring it to a distance, equal to the pitch Pr, away from the first.

In that way it is possible to overcome both dimensional variations in the section wires and structural irregularities thereof. Indeed because the helix pitch is set and fixed by the rotational speed of the spiraling machine and the speed of advance of the flexible pipe, excessive dimensional irregularities in the section wires would lead to poor positioning of the second section wire 44' with respect to the first section wire 42', being either too close to the pressure vault 38' or too far away. Thus, this method then makes it possible at any moment using the roll 94' to set the coils at a pitch Pr.

However, dimensional and geometric differences in the section wires are relatively small because these wires are obtained by drawing or by cold rolling. As a result, there is no need to provide a pitch P1 very much shorter than the optimal Pr. Hence, a pitch P1 close to the optimal pitch Pr, for example 5 to 10% shorter than the pitch Pr is perfectly suitable. Such a choice of pitch P1 makes it possible simultaneously to compensate for any adjustments needed as a result of dimensional and geometric tolerances and also not to cause significant movement of the coils thus damaging them or causing damage to the layers supporting them.

Figure 11:
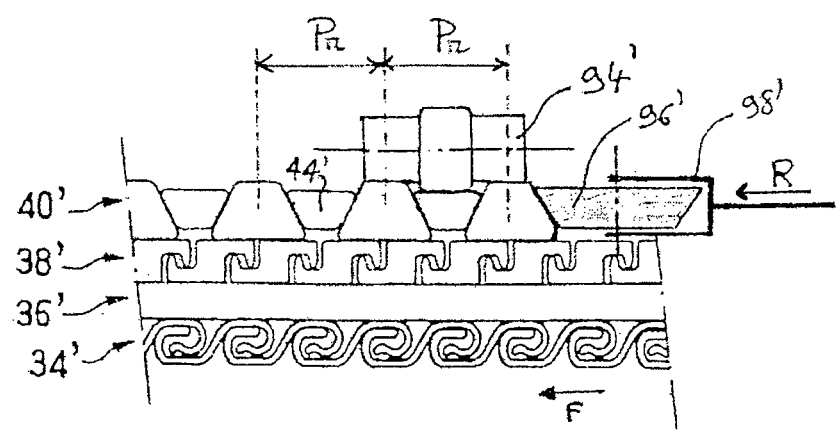
FIG. 11 is a partial schematic view showing an alternative form of said other embodiment.

According to an alternative form of this other embodiment, illustrated in FIG. 11, the role 94' is implemented by the use of a lateral press roller 96' which provides precise control over the path of the last coil of the first section wire 42' as it moves away under the action of the roll 94' and of its collar. To do that, the lateral press roller 96' is mounted to rotate on the support 98' about an axis substantially perpendicular to the flexible pipe and is of frustoconical shape so that its tread presses exactly against the inclined lateral flank of the first section wire 42'. The lateral press roller 96' is then translationally driven by force via its support 98' against the inclined lateral flank of the first section wire 42' in a direction parallel to the axis of the flexible pipe and with an intensity ranging, for example, between 10 daN and 50 daN. The support 98' may be driven in a direction R via a spring or alternatively an actuator. Thus, if the second section wire 44' is pushed in too deeply between two consecutive coils of the first section wire 42', for example as a result of an element that has by chance become lodged between the second section wire 44' and the collar of the roll 94', or alternatively as a result of the tension of the second section wire 44', it would then be raised up away from the pressure vault 38' by the action of the lateral press roller 96'. The latter would, in fact, translationally move the last coil of the first section wire 42' in the direction parallel to the flexible pipe and thereby, through a reverse wedge effect, cause the second section wire 44' to move back up and away from the pressure vault 38'.

The invention claimed is:

1. A flexible pipe comprising:
 two coaxial tubular structures, including an internal structure and an external structure outward of the internal structure;
 a tubular axial blocking layer located between the tubular structures, the tubular blocking layer comprising:
 at least two section wires which are helically wound with a short pitch:
 each of the at least two section wires having a substantially isosceles trapezoidal cross section defined by a base and two opposite lateral flanks that meet the base, and the flanks are inclined relative to one another;
 the base of one of the at least two section wires being directed toward the internal tubular structure and the base of the other of the at least two section wires is directed away from the internal tubular structure;
 the at least two section wires being wound, with the lateral flank of one section against the lateral flank of the other section and forming contiguous coils,
 wherein the contiguous coils are configured to block the pipe axially in compression, the contiguous coils defining two mating surfaces that are inclined with respect to the axis of said pipe;
 the internal tubular structure comprises:
 a structural wire wound at a short pitch which forms structural coils that are transversely blocked relative to one another;
 the one of the at least two section wires is wound pressing against the structural coils so that bending deformation of the tubular blocking layer simultaneously causes relative axial movement of the structural coils and relative transverse displacement of the contiguous coils along the inclined mating surfaces so as to allow the pipe to bend.

2. The flexible pipe as claimed in claim 1, wherein the structural wire comprises an interlocking wire formed of interlocked coils.

3. The flexible pipe as claimed in claim 1, wherein the one of the at least two section wires and the structural wire are cross-wound.

4. The flexible pipe as claimed in claim 1, wherein each lateral flank is inclined with respect to its respective base by an angle ranging between 50° and 70°.

5. The flexible pipe as claimed in claim 1, wherein a first one of the at least two section wires has a height greater than a height of a second one of the at least two section wires.

6. The flexible pipe as claimed in claim 5, wherein each of the section wires has a width of its respective base that is greater than 1.4 times a respective height of the section wire.

7. The flexible pipe as claimed in claim 5, wherein the first one of the at least two section wires has a height ranging between 1.2 and 1.6 times a height of the second one of the at least two section wires.

8. The flexible pipe as claimed in claim 7, wherein the one of the at least two section wires has a cross section of an area which ranges between 0.8 and 1.5 times the area of the other of the at least two section wires.

9. The flexible pipe as claimed in claim 5, wherein one of the at least two section wires has a top opposite the base thereof, the top and the base of the one of the two helically wound section wires respectively define two coaxial tubular envelopes spaced apart, and the other of the at least two section wires extends substantially equidistant from the tubular envelopes when the flexible pipe extends longitudinally.

10. A method of producing a flexible pipe comprises two coaxial tubular structures, including an internal structure and an external structure, and a tubular axial blocking layer located between the tubular structures, the method comprising:
 a) providing two section wires, each section wire having a substantially isosceles trapezoidal cross section defined by a base and two opposite lateral flanks that meet the base, and the flanks are inclined relative to one another;
 b) helically winding one of the two section wires with a short pitch so that the respective base of a first of the section wires is directed toward the internal tubular structure, forming first coils spaced apart, and helically winding the other of the at least two section wires between the spaced-apart first coils, so that the respective base of the second section wire is directed away from the tubular structure, and one of the lateral flanks of one of the section wires rests against one of the lateral flanks of the other of the section wires, forming contiguous coils so as to block the pipe axially in compression, wherein the contiguous coils define two mating surfaces that are inclined relative to the axis of the pipe;
 c) providing at least one structural wire;
 d) winding the at least one structural wire at a short pitch to form structural coils that are transversely blocked relative to one another; and
 e) winding the one of the two section wires pressing against the structural coils such that bending deformation of the tubular blocking layer simultaneously causes relative axial movement of the structural coils and the relative transverse displacement of the contiguous coils along the inclined mating surfaces so as to allow the pipe to bend.

11. The method as claimed in claim 10, further comprising, in step c), providing an interlocking wire that forms the at least one structural wire and, in step d), winding the interlocking wire in such a way as to form coils that are interlocked with one another.

12. The method as claimed in claim 10, comprising in step d), winding the structural wire in one direction and, in step e), winding the at least one section wire in an opposite direction so that the at least one section wire and the structural wire cross.

13. The method as claimed in claim 10, wherein the step e) includes:
 f) providing the two section wires of substantially isosceles trapezoidal section, the section wires having a base, and a top opposite the base, the lateral flanks corresponding to the non-parallel surfaces of the section wires;
 g) winding one of the two section wires on the internal tubular structure, resting the base of the one of the section wires against the internal tubular structure so as to form coils that are spaced apart by a first pitch;
 h) winding the other of the two section wires between the spaced-apart coils, pressing the top of the other of the two section wires toward the tubular structure so that the bases of the two section wires face in opposite directions to one another; and
 I) pushing in the other of the two section wires so as to separate the coils by a pitch greater than the first pitch.

14. The method as claimed in claim 13, further comprising moving the one of the two section wires translationally to bring the coils closer together so as to separate the other of the two section wires from the tubular structure.

15. The method as claimed in claim 13, further comprising fitting the other of the two section wires to be fitted equidistant from the base and the top of the one of the two section wires.

16. The method as claimed in claim 10, wherein the step e) comprises the following steps:
- f) providing two section wires of substantially isosceles trapezoidal cross-section, the section wires having a base, and a top opposite the base, the lateral flanks corresponding to the non-parallel surfaces of the section wires;
- g) winding one of the two section wires on the internal tubular structure, resting the base of the one of the section wires against the internal tubular structure so as to form coils that are spaced apart by a set distance;
- h) keeping the coils at the set distance; and
- I) winding the other of the two section wires is between the spaced-apart coils, and pressing the top of the other of the two section wires toward the tubular structure so that the bases of the two section wires face in opposite directions to one another.

\* \* \* \* \*

UNITED STATES PATENT AND TRADEMARK OFFICE
CERTIFICATE OF CORRECTION

PATENT NO.       : 8,561,648 B2
APPLICATION NO.  : 12/438064
DATED            : October 22, 2013
INVENTOR(S)      : Bectarte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1248 days.

Signed and Sealed this
Fifteenth Day of September, 2015

Michelle K. Lee
*Director of the United States Patent and Trademark Office*